United States Patent

[11] 3,545,574

| [72] | Inventor | Robin A. Cochrane |
| | | Birmingham, England |
| [21] | Appl. No. | 797,003 |
| [22] | Filed | Feb. 6, 1969 |
| [45] | Patented | Dec. 8, 1970 |
| [73] | Assignee | Girling Limited |
| | | Birmingham, England |
| [32] | Priority | Feb. 9, 1968 |
| [33] | | Great Britain |
| [31] | | No. 6659/68 |

[54] VEHICLE DISC BRAKES AND SHOE STRUCTURE
3 Claims, 4 Drawing Figs.

[52] U.S. Cl. ................................................. 188/73.1,
188/73.6, 188/250
[51] Int. Cl. ............................................. F16d 65/02
[50] Field of Search ...................................... 188/73,
73(CL), 250(B)

[56] References Cited
UNITED STATES PATENTS
3,285,371  11/1966  Cadiou ........................ 188/73

3,331,471  7/1967  Redmayne .................. 188/73
3,388,775  6/1968  Baynes et al .............. 188/73

Primary Examiner—George E. A. Halvosa
Attorney—Scrivener, Parker, Scrivener and Clarke ABSTRACT: A caliper-type disk brake having renewable brake pads which are accommodated in opposed recesses formed in the caliper body on opposite sides of the gap in the body which receives the brake disk the recesses and pads being complementarily shaped, so that, without the need for providing fastener means such as pins or screws, the pads are guided for movement towards and away from one another and are restrained against any substantial movement in planes parallel to that of the brake disk: the pads have a thickness greater than the width of the gap in the caliper body, so that they have a long working life; to make it possible to insert new pads without the need to dismantle the caliper body, each of the pad receiving recesses is formed on the side nearer to the centre of the brake disk with an opening whose length, while less than the length of the pad, is greater than the width of the pad, and the pad is formed with one end portion of reduced thickness, less than the width of the gap in the caliper body.

VEHICLE DISC BRAKES AND SHOE STRUCTURE

This invention relates to disc brakes and has particular reference to the problem of inserting brake pads into the caliper bodies of caliper type disc brakes.

It is an object of the invention to provide an arrangement which allows the insertion and ensures the proper guiding and location of replacement pads whose thickness is greater than the width of the gap of the caliper, while avoiding the need for either splitting the caliper body in the plane of its gap, or for providing pins, screws or other fastener means for constraining the pads.

In accordance with the present invention a caliper assembly for a disk brake comprises a caliper body formed with a gap for receiving a peripheral portion of the brake disc and a pair of brake pads accommodated in opposed recesses formed in the caliper body on opposite sides of the gap, the recesses and pads being complementarily shaped so that the pads disc guided for movement towards and away from one another and are constrained against substantial movement in planes parallel to that of the brake disc wherein each pad has over the major part of its area a thickness greater than the width of the gap and to permit insertion of the pad into the corresponding recess, the recess is formed on the side nearest to the centre of the brake disc with an opening whose length (circumferentially of the brake disc while less than the length of the pad is greater than the width of the pad (radially of the disc, so that one end portion of the pad can be inserted radially outwards through the opening into the recess, the other end portion of the pad being of reduced thickness, less than the width of the gap, so that on tilting the pad towards the opposite side of the caliper, the pad can be turned about its inserted end to pass its said other end through the gap and into register with the other end of the recess.

A particular embodiment of the invention will now be described by way of example only, with reference to the accompanying drawings, in which.

Figure 1:
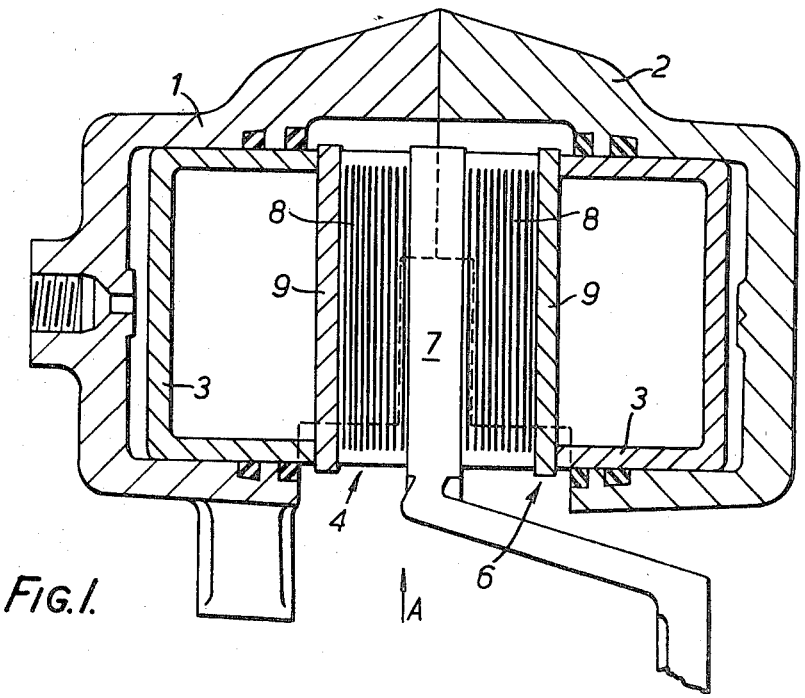
FIG. 1 is a sectional end elevation of a caliper assembly in accordance with the invention, shown in position over a brake disc.

The brake shown comprises a caliper body, formed of two portions 1, 2 securely bolted together in known manner. Each body portion includes a cylinder for an actuating piston 3, the pistons operating to press respective pad assemblies 4, 6 towards a brake disk 7, a peripheral portion of which extends into the gap in the caliper. Each pad comprises a block of friction material 8 bonded or otherwise secured to a backplate 9.

The caliper body portion on each side of the gap is formed with a recess 11 defined by arcuate end walls 12 which engage the correspondingly arcuate ends of the pad 4 or 6 accommodated in the recess. The opening left between the lower ends of the two walls 12 (which is an opening into the recess on the side nearest to the centre of the brake disc) has a length (measured circumferentially of the disc) which is substantially less than the length of the pad. It is, however, to be noted that the length of the opening left between the walls 12 is greater than the (radial) width of the pads. Thus, when the pads are in position in the recesses, the walls 12 restrain the pads against substantial movement in any direction in planes parallel to the plane of the brake disc 7 and guide the pads for movement towards and away from the brake disc. The brake disc itself prevents the pads from moving completely out of their recesses, even when the thickness of the pads has been reduced by wear.

Each pad 4, 6 has over the major part of its area a thickness which is substantially greater than the width X of the gap in the caliper left between the walls 12 of the two opposed recesses. The large thickness of the pads gives them a correspondingly long working life. One end portion of each pad is of reduced thickness, less than the width of the gap X. As shown, this is effected by means of a machined chamfer 13 on the disc-engaging face of the pad, but it could alternatively be effected by complete removal of friction material 8 from this region of the pad.

Figure 2:
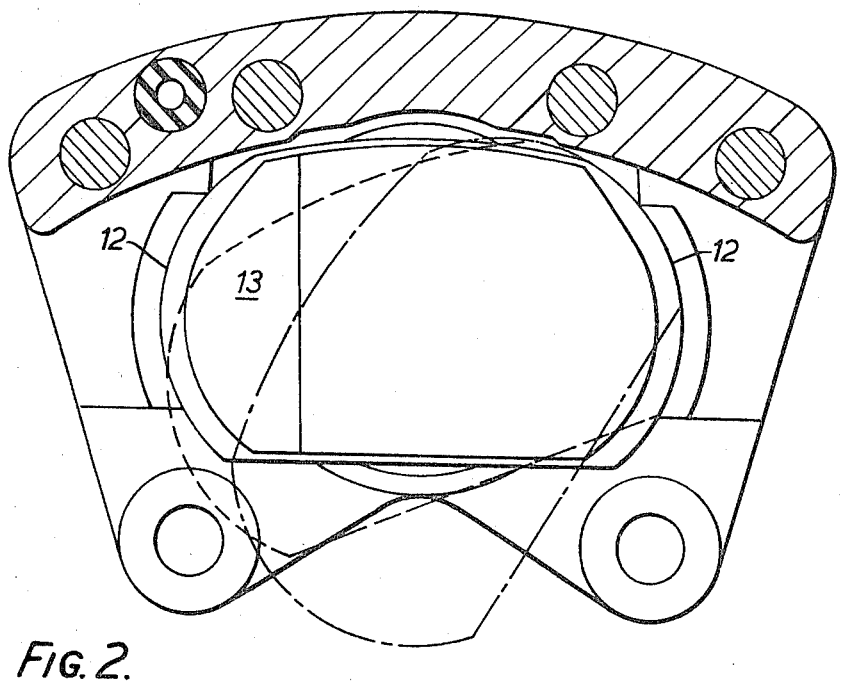
FIG. 2 is a sectional side elevation of the caliper assembly.
Figure 3:
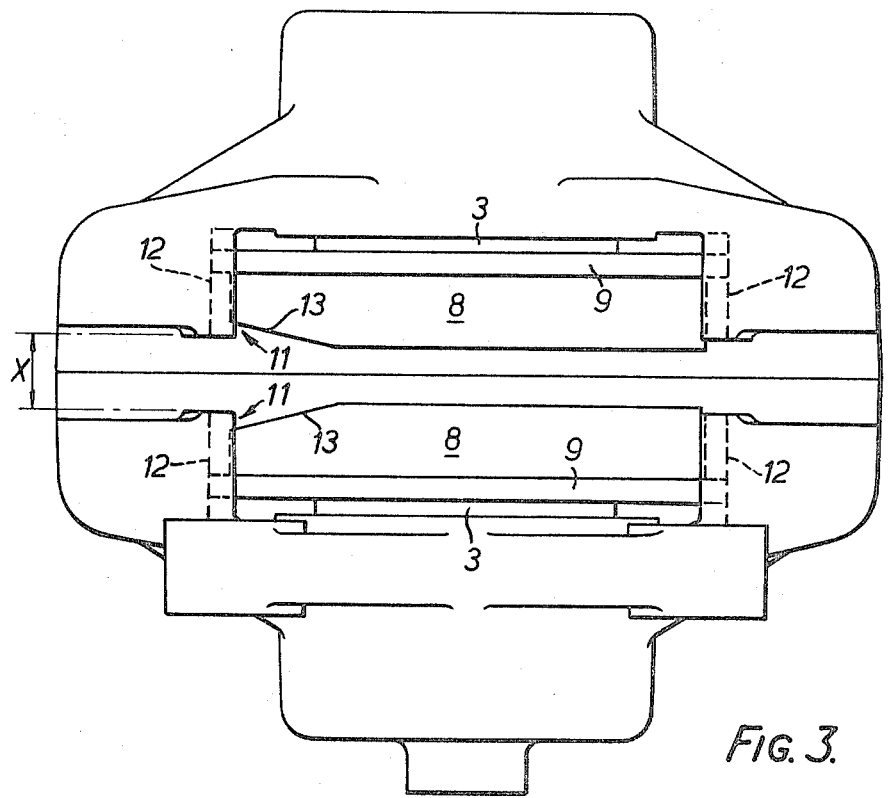
FIG. 3 is a bottom plan view of the caliper assembly looking in the direction of the arrow A in FIG. 1.
Figure 4:
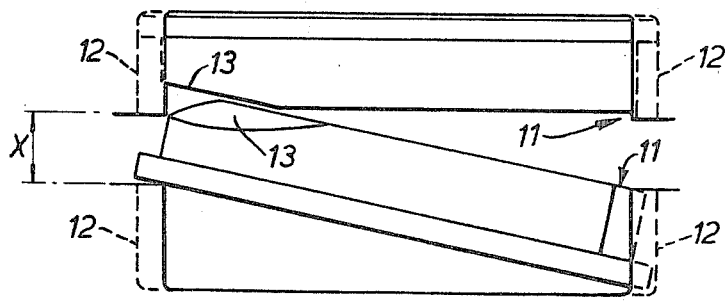
FIG. 4 is a view, corresponding to a part of FIG. 3, showing detail of an intermediate stage of pad insertion.

To fit new pads without having to release the two caliper body portions, the caliper is first removed from the disc, and the worn pads (if any), which are now substantially thinner than the caliper gap X, are removed. A new pad, 4 or 6, is then inserted in its recess 11 in the following manner: one end of the pad is inserted upwardly into the recess from below, (that is, in a direction radially outwards of the brake disc) until that end of the pad meets the corresponding surface 12, bringing the pad into the position shown in chain dotted lines in FIG. 2. The free, lower end of the pad is then tilted towards the opposite side of the caliper sufficiently for the rear of the backplate 9 to pass just clear of the sidewall 12 of the recess 11. The relieved end portion 13 of the pad can then be moved upwardly through gap X by turning the pad about an axis transverse to the caliper gap, as shown in broken lines in FIG. 2. This turning movement, during which the arcuate end of the pad slides along the correspondingly curved wall 12 of the recess, is continued until the pad is fully in register with the recess 11; the relieved end of the pad can then be moved into the recess as shown in full lines in FIG. 2. The second pad is then inserted in similar manner. FIG. 4 shows the first pad fully in position and the second in the intermediate position shown in broken lines in FIG. 2.

By this means, it becomes possible to insert two new pads, each of greater thickness than the gap X, without having to separate the caliper body portions.

Many variations and modifications will, of course, be possible within the scope of the present invention. For example, the shape of the recesses and pads could be other than as illustrated, and could for instance be generally parallel ended, with cooperating recesses and projections to key the pad against vertical movement.

I claim:

1. A caliper for a disc brake comprising a body having a gap for the reception of a brake disc and having a pair of opposed recesses in the body on opposite sides of said gap, each of said recesses having circumferentially spaced, transversely extending end walls integral with the caliper, a pair of renewable brake pads, one accommodated in each of said recesses, said recesses, including said end walls, and said pads being complementarily shaped so that the pads are guided for movement towards and away from one another while being restrained solely by the walls of the recess against any substantial movement in planes parallel to the plane of the brake disc, said pads prior to braking use having over the greater part of their areas a thickness which exceeds the width of said gap, one end portion of each of said pads being of reduced thickness less than the width of said gap, each of said recesses on the side thereof nearer to the center of the brake disc having an opening between said end walls whose circumferential length is less than the length of the corresponding pad but is greater than the radial width of said pad whereby said pads may be inserted substantially radially endwise through said openings into said recesses and thereafter rotated substantially 90° into their positions of use within said recesses.

2. The caliper of claim 1, wherein the end walls of the recesses and the end surfaces of the pads are arcuately curved.

3. The caliper of claim 1, wherein the said reduction in thickness of one end portion is obtained by chamfering the disc-engaging face of the pad.